United States Patent Office 2,837,513
Patented June 3, 1958

2,837,513

PENICILLIN SALTS

Paul Gailliot, Paris, and Jean Baget, Ermont, France, assignors to Societe des Usines Chimiques Rhone-Poulenc, Paris, France, a French body corporate No Drawing. Application December 12, 1955
Serial No. 552,276

Claims priority, application France February 3, 1955

1 Claim. (Cl. 260—239.1)

This invention relates to new penicillin salts, to a process for the production of such new salts and to pharmaceutical compositions containing them.

The new salts of the invention are those formed by the penicillin known as penicillin V [Brandl, Giovannini, Margreiter—Wiener med. Wschrift., 103, 602 (1953)] with antibiotics of the tetracycline series, such as tetracycline itself, chlorotetracycline and hydroxytetracycline. As will be described in greater detail hereinafter, these salts possess properties that could not have been foreseen in the light of the known properties of the components from which they are derived.

Tetracycline is a naphthacene derivative believed to be 1-dimethyl-amino-4:6-dioxo - 11 - methyl - 2:4a:5:7:11-pentahydroxy - 1:4:4a:6:11:11a:12:12a - octahydro-naphthacene-3-carboxyamide or a tautomer thereof. The corresponding chlorotetracycline and hydroxytetracycline contain the chlorine and hydroxy substituent in the 10-position and 12-position respectively.

In accordance with a feature of this invention, the said new salts are prepared by the action of penicillin V in the form of the acid upon the tetracycline in the form of the base. The reaction is carried out in an organic or aqueous organic solvent; such organic solvent may conveniently be an alcohol, an ether, a ketone, an ester or a chloro compound. Alternatively, the said salts may be prepared by double decomposition from a soluble salt of penicillin V and a soluble salt of a tetracycline such as the hydrochloride. The reaction medium is advantageously water, a water miscible solvent or any other medium in which the initial salts are soluble and in which the salt formed is insoluble or may be made insoluble by the addition of a suitable diluent. In either case, if the salt is obtained in solution, it may be isolated by concentrating the solution or evaporating it to dryness with the usual precautions to avoid decomposition of the penicillin.

All these operations may be carried out under sterile conditions.

The salts of the present invention are characterised by an extended antibacterial spectrum as compared to either parent substance and have the advantage that, for all occasions when the association of penicillin V and tetracycline may be prescribed, administration is simpler than the separate administration of the two antibiotics from which they are formed. A second advantage of the new salts resides in the fact that, by virtue of their low solubility, effective blood levels of penicillin V may be obtained which are more prolonged than those that can be obtained with this antiobiotic in the form of the acid or of any of the salts previously known.

For therapeutic use, the salts of the present invention, are following conventional technique, put up in the form of compositions in which the new salts (preferably uncontaminated with any substantial proportion of either parent substance) are associated with a carrier which may be either a solid material or a liquid. The compositions may thus take the form of tablets or powders, or other dosage forms which are particularly useful for oral ingestion, using solid diluents and/or excipients such as starch, lactose, talc, stearic acid, magnesium stearate, gums or the like. For parenteral administration, liquid diluents, for example water, are employed in sterile condition. Alternatively, the active substance may, with or without adjuvant material, be placed in the usual capsule or resorbable material such as the usual gelatin capsule and administered in that form.

The following examples illustrate the invention.

*Example I*

A solution of penicillin V (25 g.) in N sodium hydroxide (71.5 cc.) is added to an agitated solution of tetracycline hydrochloride (34.3 g.) in water (350 cc.). After 1 hour's agitation the precipitate obtained is filtered off, washed with water (5×50 cc.) and dried in vacuo. The salt of penicillin V and tetracyline (55 g.), M. P. about 190° C. (dec.), is thus obtained.

Percent N (on dry material)=7.13 (calculated 7.05)
$[\alpha]_D^{20} = -69°$ (c.=1, methanol)

*Example II*

Penicillin V in the form of the acid (3.5 g.) and chlorotetracycline in the form of the base (4.78 g.) are dissolved in dimethylformamide (15 cc.) at about 30° C. The solution is then cooled in an ice-bath and water (100 cc.) is added dropwise with agitation. The precipitate formed progressively solidifies and is separated and dried in vacuo in the presence of sulfuric acid. The salt of penicillin V and chlorotetracycline (5.7 g.) is thus obtained.

*Example III*

A solution of penicillin V acid (3.5 g.) in N sodium hydroxide (10 cc.) is added to an agitated solution of hydroxytetracycline hydrochloride (4.96 g.) in water (45 cc.). The mixture is left in the refrigerator for 2 hours and the solid obtained is finely ground and agitated for 15 hours is aqueous suspension. It is then separated, washed with water and dried in vacuo, in the presence of sulphuric acid. The salt of penicillin V and hydroxytetracycline (6.6 g.) is thus obtained.

We claim:
The tetracycline salt of penicillin V.

References Cited in the file of this patent

FOREIGN PATENTS 505,709     Belgium _____ Sept. 29, 1951

OTHER REFERENCES

Drug Trade News, vol. 26, Jan. 22, 1951, page 49.
Spicer: J. Lab. and Clin. Med., vol. 36, No. 2, August 1950, pages 188, 189 and 190.
Am. J. Pharm., July 1945, page 253.
Brandl et al.: Osten. Chem. Ztg., vol. 55 (1954), page 18.
Brunner: Osten. Chem. Ztg., vol 54 (1953), page 145.